(12) United States Patent
Follmer

(10) Patent No.: US 9,668,400 B2
(45) Date of Patent: Jun. 6, 2017

(54) AUTOMATIC GUIDANCE SYSTEM FOR PULL-TYPE AGRICULTURAL IMPLEMENT

(75) Inventor: Richard L. Follmer, Hudson, IL (US)

(73) Assignee: KONGSKILDE INDUSTRIES A/S, Sorø (DK)

( * ) Notice: Subject to any disclaimer, the term of this patent is extended or adjusted under 35 U.S.C. 154(b) by 1486 days.

(21) Appl. No.: 13/176,014

(22) Filed: Jul. 5, 2011

(65) Prior Publication Data

US 2013/0008360 A1   Jan. 10, 2013

(51) Int. Cl.
*A01B 69/00*   (2006.01)

(52) U.S. Cl.
CPC .................................. *A01B 69/004* (2013.01)

(58) Field of Classification Search
CPC .............................. A01B 69/004; A01B 73/06
USPC ............................... 701/50; 172/2, 7, 10, 317
See application file for complete search history.

(56) References Cited

U.S. PATENT DOCUMENTS

| | | | | |
|---|---|---|---|---|
| 3,003,789 A | * | 10/1961 | Calkins | 172/456 |
| 3,880,241 A | * | 4/1975 | Vincent | 172/311 |
| 4,246,970 A | | 1/1981 | Franke | |
| 4,504,076 A | * | 3/1985 | Bedney | 172/311 |
| 4,528,920 A | * | 7/1985 | Neumeyer | 111/164 |
| 4,555,897 A | * | 12/1985 | Degelman | 56/228 |
| 4,582,143 A | * | 4/1986 | Pratt | 172/311 |
| 4,658,911 A | * | 4/1987 | Drever et al. | 172/776 |
| 4,790,389 A | * | 12/1988 | Adee et al. | 172/776 |
| 5,113,956 A | * | 5/1992 | Friesen et al. | 172/311 |
| 5,255,756 A | | 10/1993 | Follmer et al. | |
| 5,476,147 A | * | 12/1995 | Fixemer | 172/26 |
| 6,068,062 A | * | 5/2000 | Brueggen et al. | 172/311 |
| 6,095,254 A | * | 8/2000 | Homburg | 172/6 |
| 6,131,069 A | | 10/2000 | Bottinger | |
| 6,272,405 B1 | * | 8/2001 | Kubota | 701/23 |
| 6,293,353 B1 | * | 9/2001 | Poole | 172/776 |
| 6,434,462 B1 | * | 8/2002 | Bevly et al. | 701/50 |
| 6,694,260 B1 | * | 2/2004 | Rekow | 701/466 |
| 6,702,035 B1 | * | 3/2004 | Friesen | 172/311 |
| 6,789,014 B1 | * | 9/2004 | Rekow et al. | 701/25 |
| 6,834,488 B2 | * | 12/2004 | Menichetti | 56/378 |
| 6,871,709 B2 | | 3/2005 | Knobloch et al. | |
| 7,162,348 B2 | * | 1/2007 | McClure et al. | 701/50 |
| 7,373,231 B2 | * | 5/2008 | McClure et al. | 701/50 |
| 7,383,114 B1 | * | 6/2008 | Lange et al. | 701/50 |
| 7,575,066 B2 | | 8/2009 | Bauer | |
| 7,580,783 B2 | * | 8/2009 | Dix | 701/50 |
| 7,762,345 B2 | | 7/2010 | Rozendaal et al. | |

(Continued)

*Primary Examiner* — Jamie L McGowan
(74) *Attorney, Agent, or Firm* — Adam J. Cermak; Cermak Nakajima & McGowan LLP

(57) ABSTRACT

An agricultural implement with ground-engaging implements tracks in a direction down slope when pulled by a traction vehicle over uneven, or sloped, terrain. The implement's path from the track of the vehicle depends upon, among other things, the slope of the terrain. To compensate for this tendency to drift down slope away from the pulling vehicle's track, the implement frame is provide with controllable forward and aft pivoting wing sections to which the ground engaging implements are attached. Using a GPS receiver, precise positioning information is used to position the wing sections so that the ground engaging members are directed up slope to move the implement's track upwardly in correcting its track, with the wing sections then automatically re-positioned when the implements are on the proper track.

15 Claims, 5 Drawing Sheets

(56) References Cited

U.S. PATENT DOCUMENTS

| | | | |
|---|---|---|---|
| 7,844,378 B2 * | 11/2010 | Lange | 701/50 |
| 7,904,226 B2 * | 3/2011 | Dix | 701/50 |
| 8,118,110 B2 * | 2/2012 | Tamm et al. | 172/460 |
| 8,256,526 B2 * | 9/2012 | Schmidt et al. | 172/446 |
| 8,291,994 B2 * | 10/2012 | Hulicsko | 172/311 |
| 8,359,141 B1 * | 1/2013 | Lange | 701/50 |
| 8,453,754 B2 * | 6/2013 | Beaujot | 172/2 |
| 8,494,726 B2 * | 7/2013 | Peake et al. | 701/50 |
| 8,565,984 B2 * | 10/2013 | Mayfield et al. | 701/50 |
| 2003/0187560 A1 * | 10/2003 | Keller et al. | 701/50 |
| 2004/0111202 A1 * | 6/2004 | Mailer | 701/50 |
| 2004/0124605 A1 | 7/2004 | McClure et al. | |
| 2005/0096802 A1 * | 5/2005 | Han et al. | 701/4 |
| 2006/0282205 A1 | 12/2006 | Lange | |
| 2009/0272551 A1 * | 11/2009 | Thompson et al. | 172/284 |
| 2010/0017075 A1 * | 1/2010 | Beaujot | 701/50 |
| 2010/0307780 A1 | 12/2010 | Hulicsko | |
| 2011/0054729 A1 * | 3/2011 | Whitehead et al. | 701/29 |
| 2012/0240546 A1 * | 9/2012 | Kormann | 56/344 |
| 2013/0186657 A1 * | 7/2013 | Kormann et al. | 172/1 |

* cited by examiner

AUTOMATIC GUIDANCE SYSTEM FOR PULL-TYPE AGRICULTURAL IMPLEMENT

FIELD OF THE INVENTION

This invention relates generally to strip tillage of the soil, and is particularly directed to strip tillage on sloped terrain, such as encountered on hillsides and in gullies.

BACKGROUND OF THE INVENTION

Strip tillage is a farming practice which has evolved primarily out of no-till farming. In no-till farming, the field is generally plowed under after harvest, but is left in an untilled state with crop residue covering the field. The crop residue is effective in limiting soil erosion. Strip tillage involves the tilling of a narrow strip of soil, rather than the entire field which is followed by a planter row unit directly in each of the strips. Thus, only the elongated strips, or zones, of ground will be planted with the upcoming season's row crop. In strip tillage and no-till, the farmer typically uses a less aggressive tilling method and does not completely plow or turn the soil under. Over time, farmers increase the fracture of the ground and the air pore space within the soil to enhance root growth area to support more productive plants.

Strip tillage requires precise positioning of the agricultural implements with each pass through the field. End strips of adjacent passes should optimally be positioned as closely as possible to ensure the development of highly productive plants. Too large a space results in a waste of soil area, while too close spacing restricts development of the plants in adjacent rows. Accurate positioning of the soil working implements becomes increasingly difficult with irregularities in the surface of the soil. When operating on a slope, the pulled implements tend to drift down slope and below the track of the traction vehicle pulling the implements, resulting in non-uniform spacing between adjacent rows. The extent of down slope drift increases with the change in elevation of the soil surface.

The present invention addresses these challenges in strip tillage by providing for the automatic positioning of agricultural implements in precisely placed strips for each field pass using a global positioning system (GPS) for precisely controlling inter-strip spacing during on-the-go operations.

OBJECTS AND SUMMARY OF THE INVENTION

Accordingly, it is an object of the present invention to provide a method and apparatus for improved strip tillage operations.

It is another object of the present invention to provide highly accurate positioning of an agricultural implement for each successive pass relative to a narrow strip of soil previously tilled when operating on uneven terrain.

A further object of the present invention to provide precise positioning of an agricultural implement to sub-inch accuracies for soil working operations on sloped terrain.

A still further object of the present invention is to provide automatic correction of the position of a tillage machine to provide properly spaced tillage passes relative to previously tilled strips when traversing sloped fields.

Yet another object of the present invention is to provide a flexible tillage frame with a satellite-based automatic positioning feature which ensures highly accurate implement positioning for strip tillage particularly on sloped fields.

Still another object of the present invention is to provide for the precise positioning of ground engaging agricultural implements relative to previously planted strips on sloped terrain without reference to the position of the traction vehicle pulling the implements.

The present invention contemplates a method and apparatus for strip tilling a field having an uneven surface, the method comprising the steps of: establishing a straight line extending the length of the field using satellite-based positioning information; determining a pre-determined offset distance from the straight line corresponding to the distance between adjacent tillage strips; traversing the field along or parallel to the straight line while pulling a draw bar having plural ground engaging implements attached thereto, the drawbar having a center section and left and right wing sections, each coupled to a respective opposed end of the center section and capable of forward and aft pivoting movement relative to the center section; comparing the position of the drawbar during a pass of the field with the pre-determined offset distance from the straight line; pivoting the left and right wing sections in first and second opposed directions relative to the center section when the position of the drawbar and the pre-determined offset distance do not coincide to correct for down slope drift of the drawbar caused by the uneven surface of the field; and pivoting the left and right wing sections in third and fourth opposed directions relative to the center section when the position of the drawbar coincides with the pre-determined offset distance to traverse the field parallel to and at the pre-determined offset distance relative to the straight line.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
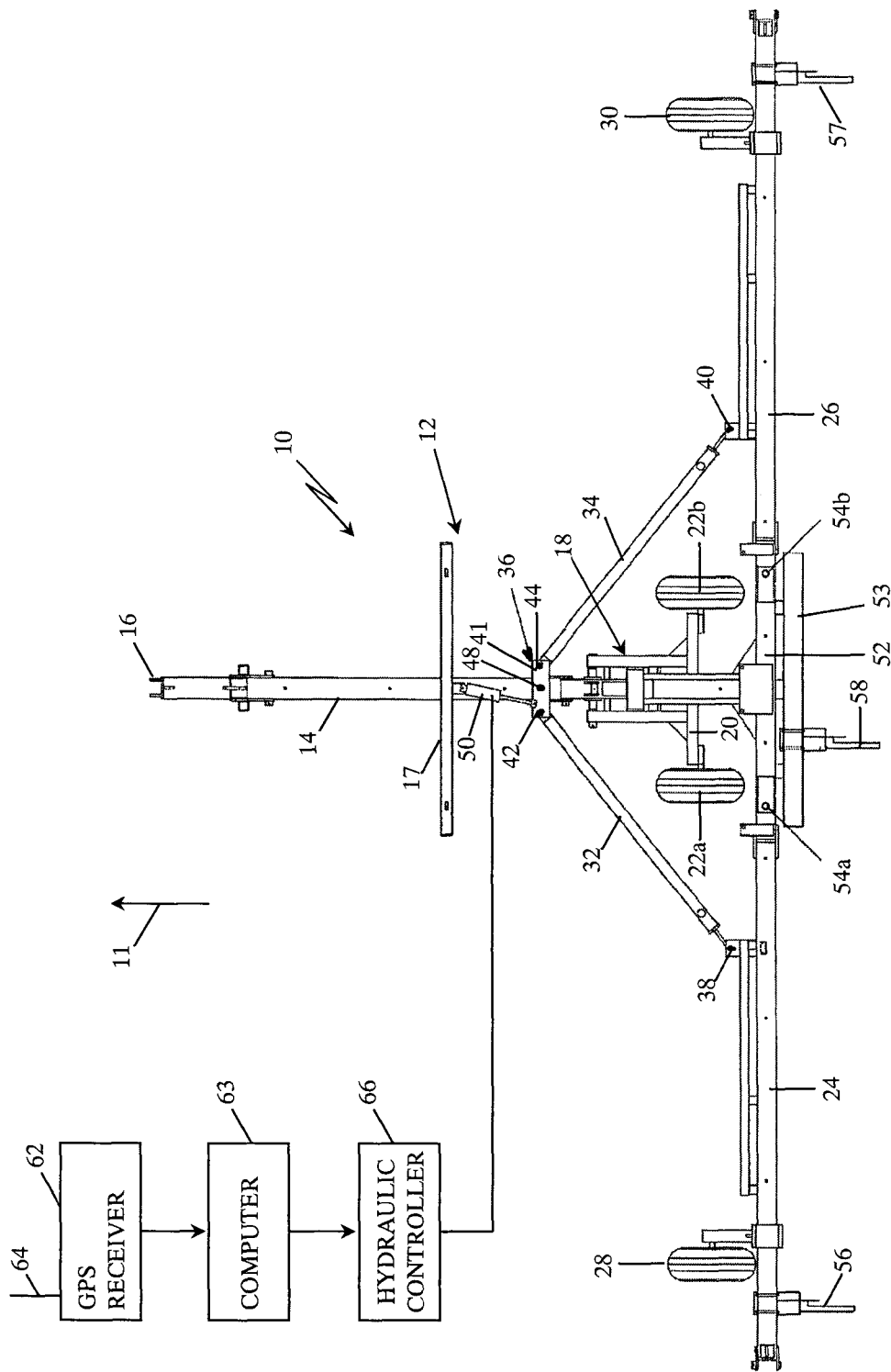
FIG. 1 is a top plan view of an agricultural implement having an automatic guidance system in accordance with the principles of the present invention.

Referring to FIG. 1, there is shown a top plan view of an agricultural implement with an automatic guidance system 10 in accordance with the principles of the present invention. The agricultural implement with an automatic guidance system 10 includes an agricultural implement 12 adapted to be pulled by a traction vehicle, which is not shown in the figures for simplicity. Agricultural implement 12 includes an elongated frame member typically tubular in form 10 having a hitch 16 mechanism on its forward end for secure attachment to a traction vehicle.

In operation, agricultural implement 12 generally travels in the direction of arrow 11. The longitudinal axis of elongated frame member 14 is thus aligned with arrow 11 as the agricultural implement is pulled by a traction vehicle.

Attached to an aft end of elongated frame member 14 is a carrier frame 18. Carrier frame 18 includes an axle aligned generally transverse to the direction of travel of the agricultural implement 12. Attached to opposed ends of axle 20 are first and second ground engaging wheels 22a and 22b.

Attached to an aft end of carrier frame 18 is an aft transverse structural member 52 also aligned generally perpendicular to the direction of travel of the agricultural implement 12. Attached to and disposed aft of the aft transverse structural member 52 is a drawbar 53.

Pivotally attached to the left end of the aft transverse structural member 52, as viewed in FIG. 1, by means of left pivot pin 54a is a left wing section 24. Pivotally coupled to the right end of the aft transverse structural member 52 by means of a right pivot pin 54b is a right wing section 26. Mounted to the left wing section 24 and to the right wing section 26 are left and right ground engaging wheels 28 and 30, respectively. Just as the first and second wheels 22a and 22b provide support and allow for motion of the carrier frame 18, the left and right ground engaging wheels 28, 30 respectively support and allow for motion of left and right wing sections 24 and 26.

Mounted to an aft portion of elongated frame member 14 is a pivot mechanism 36. Pivot mechanism 36 includes a generally flat plate 41. Attached to flat plate 41 are first, second and third pivot pins, 42, 44 and 48. First pivot pin 42 is coupled to a first end of a left draft link 32. Second pivot pin 44 is connected to a first end of a right draft link 34. Plate 41 is pivotally coupled to elongated frame member 14 by means of the third pivot pin 48.

A second opposed end of the left draft link 32 is pivotally coupled to left wing section 24 by means of a first coupling bracket and pivot pin 38. Similarly, a second opposed end of the right draft link 34 is pivotally coupled to the right wing section 26 by means of a second coupling bracket and pivot pin 40. Thus, left draft link 32 is freely movable relative to first pivot pin 42 and to the first coupling bracket and pivot pin 38, while right draft link 34 is freely movable relative to second pivot pin 44 and second coupling bracket and pivot pin 40.

Pivotally attached to elongated frame member 14 and the flat plate 41 of the pivot mechanism 36 is a hydraulic cylinder 50. Hydraulic cylinder 50 is of the dual acting type capable of both extension and retraction under the control of a hydraulic control system 66 which also typically would be mounted to agricultural implement 12. Also shown in FIG. 1 is the combination of GPS receiver 62 with antenna 64 coupled to a computer 63. Computer 63 is coupled to hydraulic controller 66 for controlling its operation and is programmed to carry out the series of steps of the inventive method described in detail below.

Figure 2:
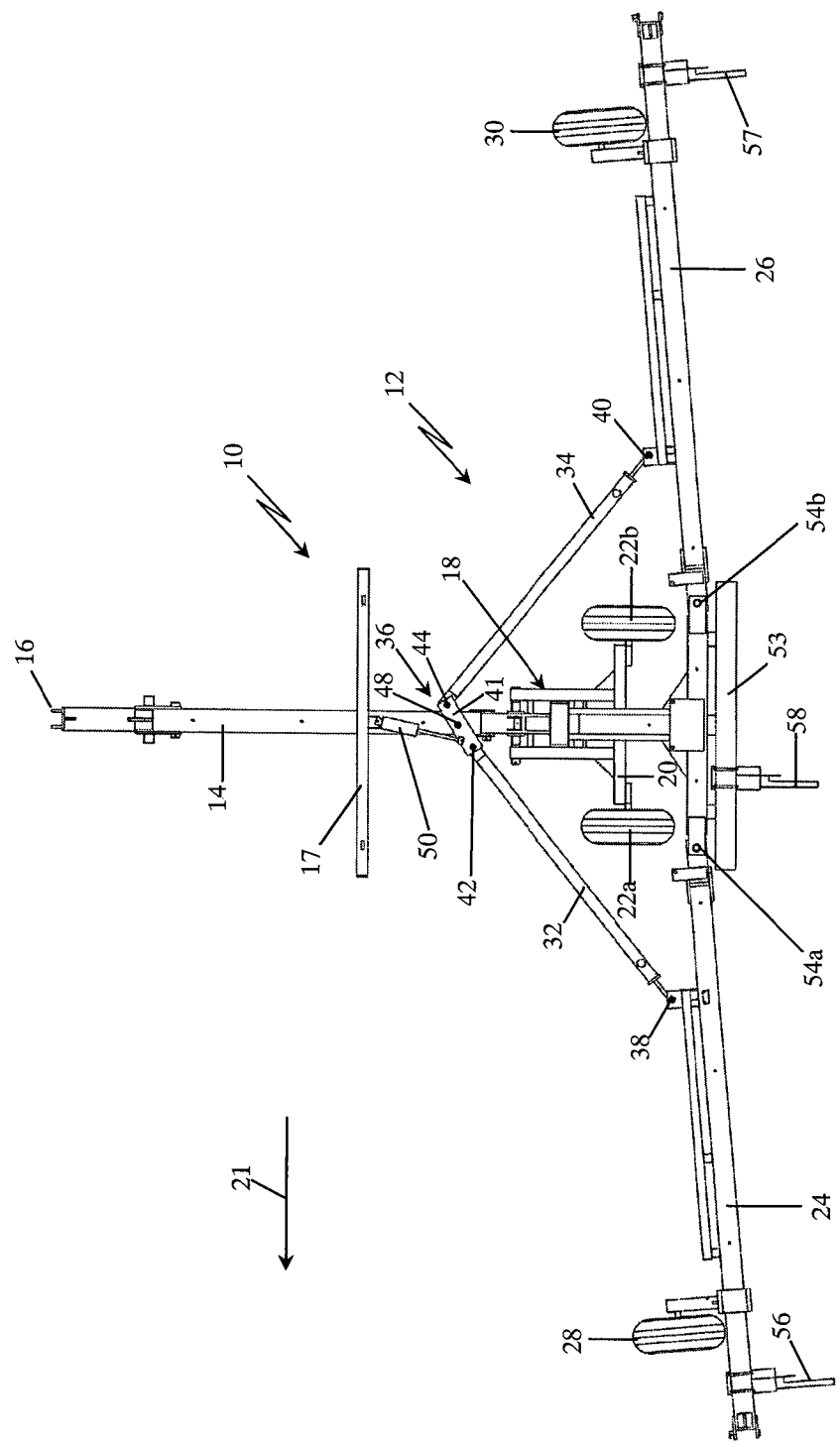
FIG. 2 is a top plan view of the inventive agricultural implement of FIG. 1 showing the implement making a change in its direction of travel in a first direction in accordance with the present invention.
Figure 3:
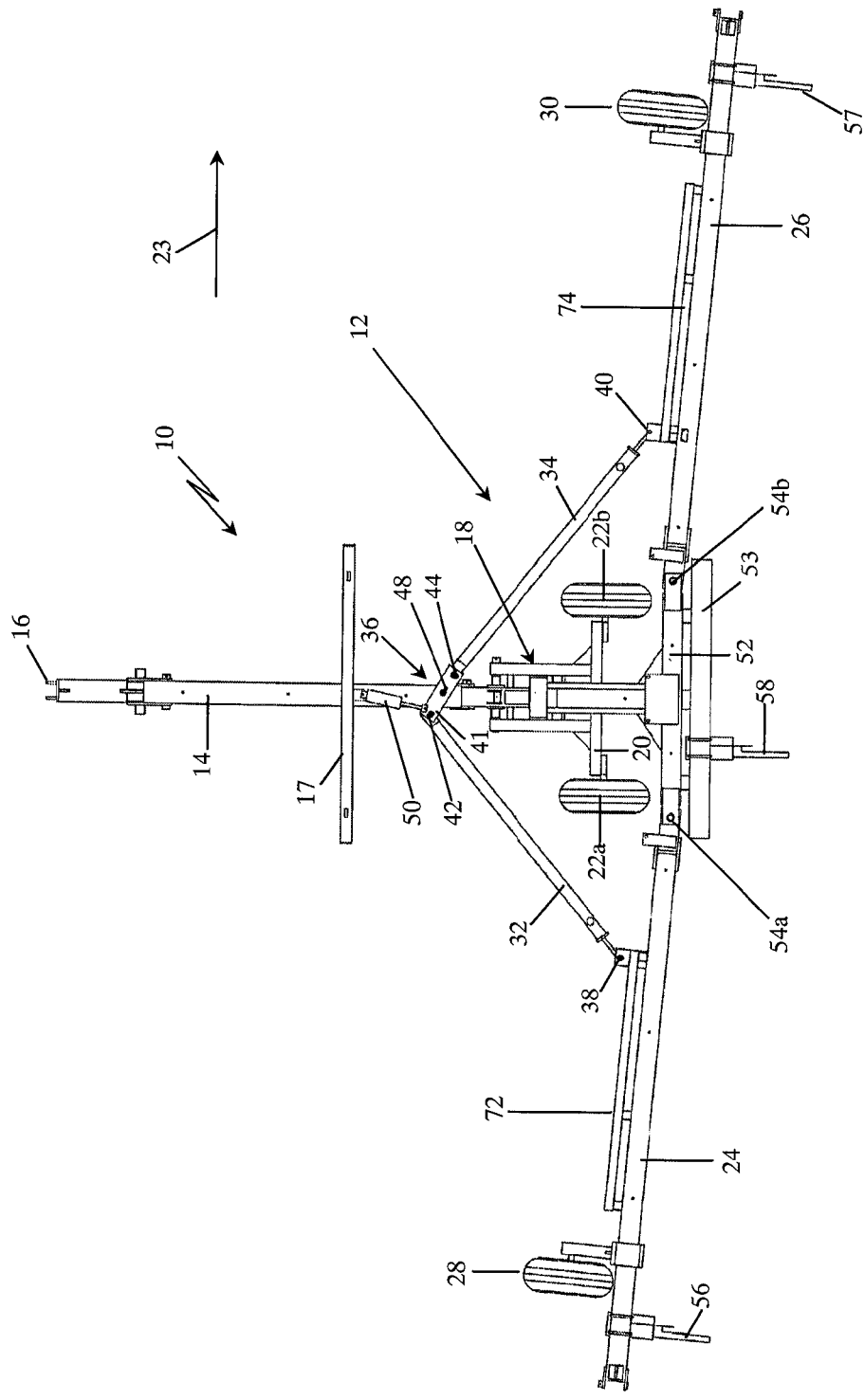
FIG. 3 is a top plan view of the inventive agricultural implement of FIG. 1 showing the implement making a change in its direction of travel in a second, opposed direction from that shown in FIG. 2.

As shown in FIG. 2, extension of hydraulic cylinder 50 causes a downward pivoting displacement of left wing section 24 and an upward pivoting displacement of right wing section 26. Similarly, as shown in FIG. 3, retraction of hydraulic cylinder 50 causes upward pivoting displacement of left wing section 24 and downward pivoting displacement of right wing section 26. It is in this manner that the left and right wing sections 24, 26 may be pivotally displaced in a coordinated manner about aft transverse structural member 52 in either forward or aft directions.

Attached to respective forward portions of the left and right wing sections 24, 26 are left and right slide brackets 72 and 74. Left slide bracket 72 is in sliding engagement with first coupling bracket and pivot pin 38, while right slide bracket 74 is in sliding engagement with second coupling bracket and pivot pin 40. This sliding arrangement allows the left and right wing sections 24, 26 to be pivotally displaced in a full forward position for transport and storage of the agricultural implement with the automatic guidance system 10. A cross member 17 is attached fixedly to elongated frame member 14 and is adapted to engage and provide support for the left and right wing sections 24, 26 when in the stored position. In the stored position, the left and right wing sections 24, 26 are positioned adjacent and generally parallel to the agricultural implement's elongate frame member 14.

Attached respectively to left and right wing sections 24, 26 are first and second ground engaging implements such as coulters 56 and 57. A third ground engaging implement such as a coulter 58 is attached to drawbar 53. Each of these coulters is rigidly attached to either one of the pivoting wing sections or to the drawbar. During normal operation, additional ground engaging implements would typically be attached to the first and second wing sections 24, 26 and to drawbar 53, but only three such ground engaging implements are shown in the various figures for simplicity. These grounding engaging implements may take various forms, in addition to that of coulters, such as planter units, soil working implements or fertilizer units. Typically, one ground engaging implement is provided for each row formed in strip tillage.

Figure 4:
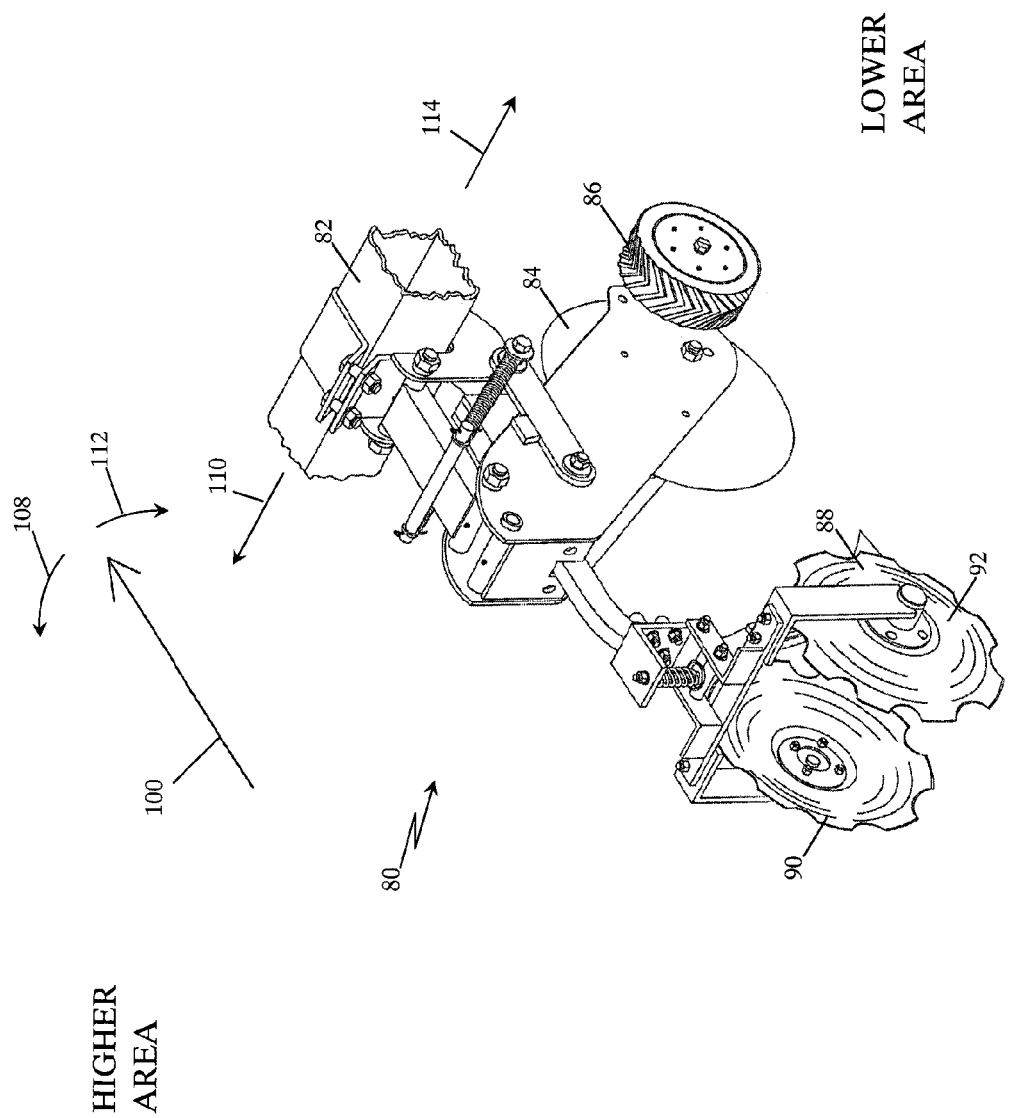
FIG. 4 is an upper perspective view of a typical ground engaging implement capable of use with the present invention.

Referring to FIG. 4, there is shown an upper perspective view of a ground engaging implement 80 typical of the implements with which the inventive agricultural implement with automatic guidance system is intended for use. Ground engaging implement 80 is shown fixedly attached to a pivoting wing section 82 as previously described. Ground engaging implement includes a smooth front coulter 84 and a pair of gauge wheels disposed on opposed sides of the coulter, where one gauge wheel is shown as element 86. The gauge wheels 86 set the depth of the front coulter 84 through the soil. Trailing the front coulter 84 is a soil engaging knife fertilizer 88 which forms a shallow furrow, or groove, in the soil into which fertilizer is deposited. The furrow is then covered by means of first and second disc sealers 90 and 92 to ensure that the fertilizer remains in the soil for subsequent planting operations.

In FIG. 4, the field traversed by the grounding engaging implement 80 is shown as having a lower area on the right side of the grounding engaging implement as it traverses the field in the direction of arrow 100. A higher area of the field is shown on the left side of the grounding engaging implement 80 as it traverses the field. The tendency of the ground engaging implement 80, and any other grounding engaging implement attached to the same pivoting wing section to which grounding engaging implement is attached, is also to drift from left to right from the higher area to the lower area of the field as shown by the direction of arrow 114.

The present invention corrects for this drift caused by the uneven contour of the field by changing the orientation of the ground engaging implement 80 so that it is turned toward the higher area in the direction of the first turning direction arrow 108 shown in FIG. 4. Turning the grounding engaging implement 80 in the direction of the first turning direction arrow 108 causes the soil to exert a sideways pressure on the implement in the direction of arrow 110 toward the area of higher elevation in the field. The ground engaging implement's coulter 84 functions in the soil as does a boat's rudder in water by steering the ground engaging implement 90 on a desired course, or track, through the soil. This causes the grounding engaging implement 80 to travel upslope toward the higher area in initiating a correction to its course through the field.

When it is determined that this change in course has caused the ground engaging implement 80 to be re-positioned on the desired course for the next strip tillage row, the ground engaging implement 80 undergoes a second turn in the direction of turning arrow 112 so as to transit the field on a pre-determined course which is parallel to and offset a pre-determined distance from the previous tilled strip. Similarly, if the higher area were to the right of the ground engaging implement 80 as shown in FIG. 4, first turning the ground engaging implement in the direction of a second turning direction arrow 112 would cause pressure to be applied to the coulter 96 by the soil in the direction of arrow 114. This would allow the ground engaging implement 80 to change its course in the field in a rightward direction as shown in FIG. 4, which correction would be maintained upslope until it was determined that the ground engaging implement 80 had reached the desired track through the field relative to the previous pass through the field. A second correction would then be introduced in the direction of the first turning direction arrow 108 to allow the ground engaging implement to remain on the desired track through the field which is parallel to and spaced a pre-determined distance from the previously formed tilled strip.

The operation of the present invention as just described in terms of FIG. 4 can also be explained in terms of FIGS. 2 and 3 for the case of the entire agricultural implement 12 having plural spaced coulters 56 and 57 respectively mounted to its left and right pivoting wing sections 24 and 26. For example, with reference to FIG. 2, rearward pivoting displacement of left wing section 24 and forward pivoting displacement of right wing section 26 as shown in FIG. 2, results in the application of leftward pressure on first and second coulters 56, 58 in the direction of arrow 21 causing the agricultural implement 12 to alter its track through a field in a leftward direction.

Similarly, forward pivoting displacement of left wing section 24 and rearward pivoting displacement of right wing section 26 as shown in FIG. 3, will result in the application of increased pressure by the soil on the first and second coulters 56 and 57. This increased pressure would be in the direction of arrow 23 in FIG. 3 causing agricultural implement 12 to turn in a rightward direction to alter its course through the field. The change in course of the agricultural implement 12 discussed in terms of FIG. 2 or 3 will be maintained until the position of the agricultural implement coincides with the desired track relative to the reference line through the field discussed above. A second correction is then implemented in terms of the pivoting displacement of the left and right wing sections 24, 26 so that the agricultural implement 12 tracks through the field on the desired course which is parallel to and displaced a pre-determined distance from the aforementioned reference line through the field.

Figure 5:
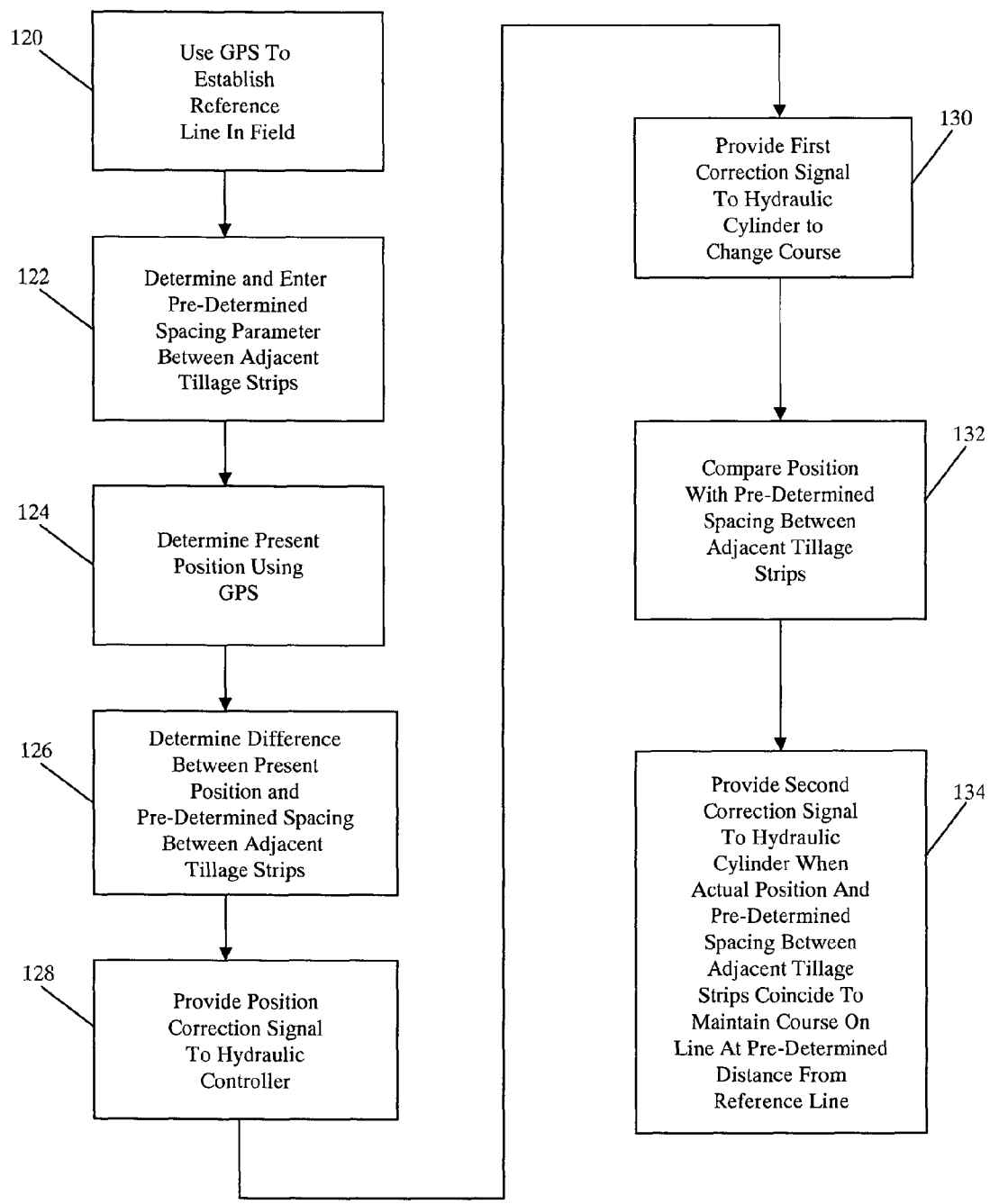
FIG. 5 is a simplified block diagram showing the series of steps involved in carrying out the automatic guidance method for a pull-type agricultural implement in accordance with the present invention.

Referring to FIG. 5, there is shown a flow chart illustrating the series of steps involved in carrying out the method of providing automatic guidance for a pull-type agricultural implement in accordance with an embodiment of the present invention. Each block in FIG. 5 represents a step, or plural steps, in carrying out the method of the present invention. The inventive method starts at step 120 with the establishment of a referenced line in a field using two points defined by a global positioning satellite ("GPS") system. The line will be defined typically as one side of the field to be stripped tilled. After defining a reference line in the field and storing this information in computer 63, the user then enters a pre-determined spacing parameter between adjacent strip tillage passes over the field at step 122. This pre-determined spacing will be dependent upon various parameters such as the type of crops to be planted and characteristics of the soil. The program stored in the computer 63 then at step 124 determines the present position of the ground engaging implement using the GPS system. The program then at step 126 determines the difference between the present position of the ground engaging implement and the pre-determined spacing between adjacent passes in the strip tillage operation at step 126. At step 126, the program also provides a correction signal to the hydraulic controller 66 for controlling the angle of attack of the ground engaging implement such as coulters 56 and 57. A first correction signal is then provided to hydraulic cylinder 68 for the purpose of changing the course, or track, of the ground engaging implement through the field at step 128.

The program stored in computer 63 then at step 130 compares the actual position of the ground engaging implement with the pre-determined position at step 130 during the course correction made by the ground engaging implement. When the actual and pre-determined positions of the ground engaging implement coincide, a second correction signal is provided to the hydraulic cylinder 50 for changing the track of the ground engaging implement so as to be parallel with the original reference line and located at a pre-determined distance from that reference line.

While particular embodiments of the present invention has been shown and described, it will be apparent to those skilled in the yard that changes and modifications may be made without departing from the invention and its broader aspects. Therefore, the aim in the appended claims is to cover all such changes and modifications that fall within the true spirit and scope of the invention. The matter set forth in the foregoing description and accompanying drawings is offered by way of illustration only and not as imitation. The actual scope of the invention is intended to be defined in the following claims when viewed in theirs perspective based on the prior art.

I claim:

1. A method for strip tilling a field having an uneven surface, said method comprising the steps of:
    establishing a straight line extending the length of the field using satellite-based position information;
    determining a pre-determined offset distance from said straight line corresponding to the distance between adjacent tillage strips;
    traversing the field along or parallel to said straight line while pulling a drawbar having plural ground engaging implements attached thereto, said drawbar having a center section and left and right wing sections, each coupled to a respective opposed end of said center section and capable of forward and aft pivoting movement relative to said center section;
    comparing the position of the drawbar during a pass of the field with said pre-determined offset distance from the straight line;
    pivoting said left and right wing sections in first and second opposed directions relative to said center section when the position of said drawbar and said pre-determined offset distance do not coincide to correct for down slope drift of said drawbar caused by the uneven surface of the field; and pivoting said left and right wing sections in third and fourth opposed directions relative to said center section when the position of the drawbar coincides with said pre-determined offset distance to traverse the field at said pre-determined offset distance relative to the straight line.

2. The method of claim 1 wherein said first and second directions are opposite to said third and fourth directions.

3. The method of claim 2 wherein when the surface of the field slopes downward from left to right, said left wing pivots aft and said right wing pivots forward, and when the surface of the field slopes downward from right to left, said left wing pivots forward and said right wing pivots aft to correct for down slope drift of said drawbar.

4. The method of claim 2 wherein said left and right wing sections are displaced substantially the same distance when said wing sections are pivotally displaced over said first and second opposed directions and over said third and fourth opposed directions.

5. The method of claim 1 wherein each implement engages the ground along an axis extending in the direction of travel of the drawbar through the field.

6. The method of claim 1 wherein the ground engaging implements turn the soil over.

7. The method of claim 1 wherein the ground engaging implements reduce plant residue in the field.

8. The method of claim 1 wherein the ground engaging implements plant seeds.

9. The method of claim 1 wherein the ground engaging implements deposit fertilizer in the field.

10. A system for strip tilling a field having an uneven surface using an implement frame with plural ground engaging implements, wherein said implement frame is subject to departing from a pre-determined track spaced from a strip previously formed in an earlier pass of the field by moving down slope when traversing an uneven portion of the surface of the field, said system comprising:
  a GPS receiver for providing present position information;
  a flexible implement frame pulled through the field by a traction vehicle and having first and second pivoting frame members each having at least one respective ground engaging implement fixedly attached thereto, wherein said first and second pivoting fame members are moveable between a first position wherein said ground engaging implements are aligned with and track along the direction of motion of said implement frame through the field and a second position wherein said ground engaging implements are aligned and track along a direction upslope from the direction of motion of said implement through the field; and
  a position controlling arrangement coupled to said GPS receiver for receiving said present position information and coupled to said flexible implement frame for controlling the position of said first and second pivoting frame members, wherein said position controlling arrangement compares the present position of said ground engaging implements to the position of the pre-determined track spaced from a previously formed strip and, when the present position and the position of the pre-determined track do not coincide, said position controlling arrangement changes the positions of said first and second pivoting frame members so that said ground engaging members assume said second upslope position so that the track of said ground engaging implements changes so as to coincide with said pre-determined track.

11. The system of claim 10 further comprising first and second pivoting connections respectively coupling said first and second pivoting frame members to said implement frame for allowing said first and second pivoting frame members to pivot forward and aft relative to the track of the ground engaging implements through the field.

12. The system of claim 11 wherein said first and second pivoting frame members are respectively disposed on left and right sides of said implement frame and when the upslope of the field extends from right to left of said implement frame, said first and second pivoting frame members are respectively moved aft and forward relative to the track of the ground engaging implements through the field, and when the upslope extends from left to right of said implement frame, said first and second pivoting frame members are respectively moved forward and aft relative to the track of the ground engaging implements through the field.

13. The system of claim 12 further comprising first and second draft links coupled at respective first ends to said first and second pivoting frame members and at respective opposed second ends to said implement frame for pivotally displacing said pivoting frame members forward or aft.

14. The system of claim 13 further comprising the combination of a pivoting plate and a hydraulic cylinder attached to said implement frame, wherein said pivoting plate is further coupled to respective second ends of said first and second draft links and said hydraulic cylinder is coupled to said pivoting plate for moving said pivoting plate and said first and second draft links in displacing said first and second pivoting frame members forward or aft.

15. The system of claim 14 further comprising a computer coupled to said GPS receiver and to said hydraulic cylinder for controlling forward and aft pivoting displacement of said first and second pivoting frame members.

\* \* \* \* \*